United States Patent [19]

Smith

[11] 4,014,373

[45] Mar. 29, 1977

[54] VEHICLE FOR REMOVING AND COMMINUTING STANDING TREES

[76] Inventor: Stuart L. Smith, 506 N. Center Ave., Merrill, Wis. 54452

[22] Filed: Feb. 13, 1976

[21] Appl. No.: 657,890

[52] U.S. Cl. .............................. 144/3 D; 144/34 E; 144/309 AC; 241/101.7
[51] Int. Cl.² ........................................ A01G 23/08
[58] Field of Search ................ 241/101.7; 144/2 F, 144/3 D, 3 R, 34 R, 34 E, 309 AC

[56] References Cited

UNITED STATES PATENTS

| 3,421,558 | 1/1969 | Thompson | 144/309 AC X |
| 3,651,845 | 3/1972 | Propst | 144/309 AC |

Primary Examiner—Othell M. Simpson
Assistant Examiner—W. D. Bray
Attorney, Agent, or Firm—John S. Roberts, Jr.

[57] ABSTRACT

A unitized system for removing and comminuting entire standing trees including a vehicle positioned to sever standing trees in place, transporting the severed tree in an upright condition on the severing blade to a conveyer and lifting and conveying the upright tree to a comminuter hopper on the rear of the vehicle for reduction to wood chips.

11 Claims, 4 Drawing Figures

VEHICLE FOR REMOVING AND COMMINUTING STANDING TREES

BACKGROUND OF THE INVENTION

Trees are a primary source of cellulose for many industries, including the paper industry. It was heretofore the practice to fell trees and haul them considerable distances before reducing them to chips for further processing. This procedure was inefficient due to the transported bulk and the several operations required.

Recent innovations in this art have included use of portable plants to reduce the trees to chips in situ at the scene of the felling operation. Such operations still require felling, short drags, cleaning and elevation of the trees to the level of the chip conveyor, thereby not providing the most efficient or cleanest method of wood reduction.

Some devices, such as that disclosed in U.S. Pat. No. 3,533,458 to McColl, fell and comminute trees in situ, however, devices such as this process only the tree trunks, leaving the branches, constituting a considerable bulk of the tree, on the ground.

SUMMARY OF THE PRESENT INVENTION

This invention provides a unitized system for felling, conveying, and reducing an entire standing tree, including the branches, to wood chips in a single, mobile apparatus.

The invention also provides a device which will process a standing tree to wood chips without requiring cleaning of dirt therefrom by holding the tree vertical and precluding it from touching the ground during the process.

This invention also provides a device which processes entire trees, including limbs, to wood chips without requiring power loss through separate skidding, lifting, or felling operations by furnishing means to accomplish all three in one apparatus.

The invention also provides an efficient machine for providing wood chips by furnishing an apparatus which can process several trees simultaneously.

The invention also provides means to crush and process a tree and its branches in a single operation.

These and other objects and many of the attendant advantages of the invention will become better understood to those skilled in the art by reference to the following detailed description when viewed in light of the accompanying drawings wherein:

DESCRIPTION OF A PREFERRED EMBODIMENT

Figure 1:
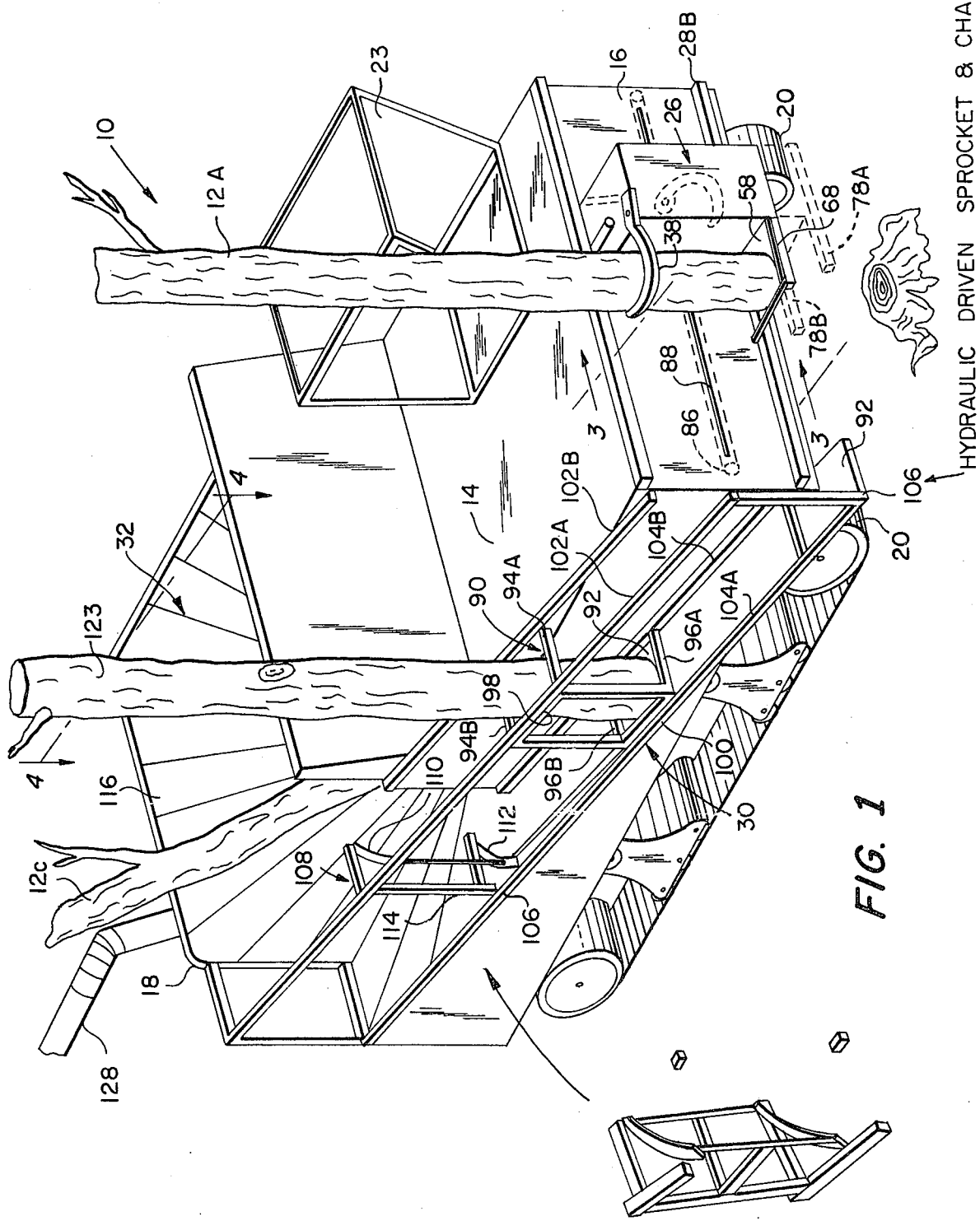
FIG. 1 is a perspective view of an apparatus in accordance with the invention.

In FIG. 1 the apparatus indicated generally at 10 is shown in perspective processing a series of trees 12A, 12B, and 12C. The apparatus 10 comprises a vehicle having a body 14 with front and rear ends 16 and 18, ground engaging crawler tracks 20 of conventional style driven and controlled by a prime mover or movers (not shown but preferably a 12V71 Detroit diesel) in a manner and by means well known in the art. A control cab 27 for housing the apparatus operator and his controls is disposed on the left hand side of the vehicle.

The tree harvesting and comminuting components comprise three basic elements mounted on the vehicle body 14, generally comprising a tree removing means 26 mounted on upper rail 28A and lower rail 28B on the front end 16 of the body 14 for transverse movement thereacross, an inclined tree conveying means 30 disposed on the right side of the body 14 and sloped to move from the bottom of the body proximate the front end 16 to the top of the body proximate the rear end 18 thereof and a tree comminuting means 32 at the rear of the body 14 communicating with the conveying means 30.

Figure 2:
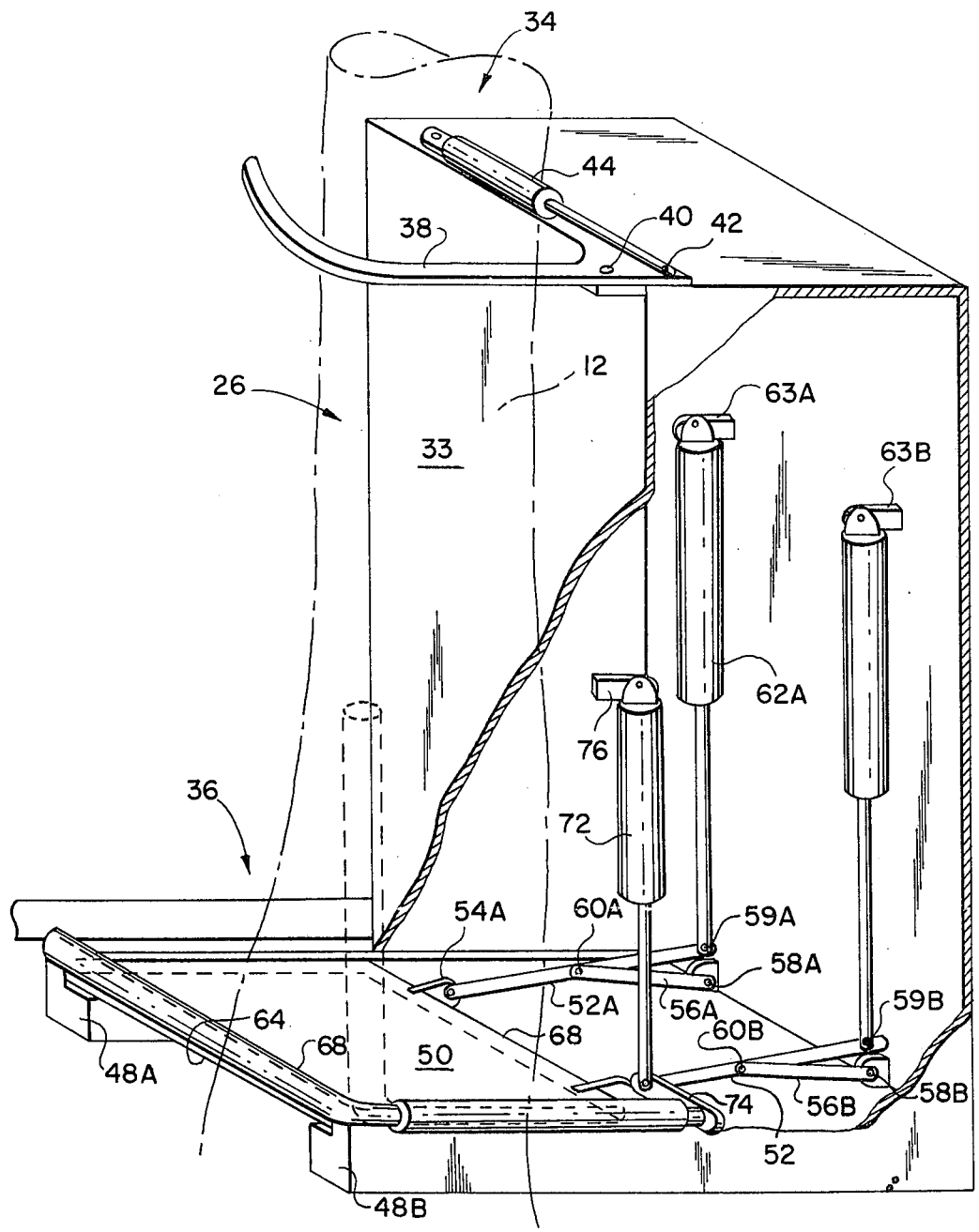
FIG. 2 is a fragmentary sectional enlarged view of a portion of the apparatus of FIG. 1.
Figure 3:
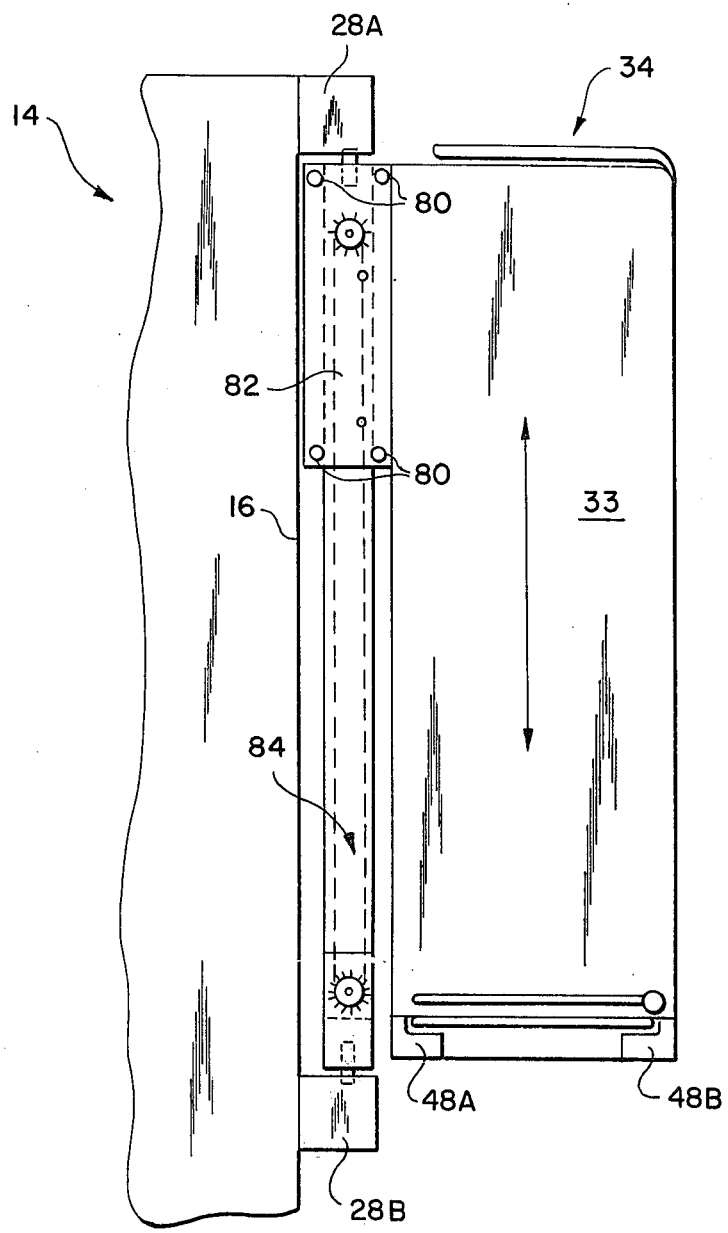
FIG. 3 is an enlarged fragmentary view of the apparatus of FIG. 1 taken along the line 3—3 thereof.

Referring more particularly to FIGS. 2 and 3, the tree removing means 26 comprises a housing 33, a grip means, indicated generally at 34, mounted on the top of the housing and a shear means generally shown at 36, mounted at the base of the housing 33. The grip means 34 comprises a curved arm 38 pivotally mounted at 40 intermediate the ends thereof. The curved end of the arm 38 is configured to grip a tree, in the position shown in FIG. 2, and is pivotally connected at 42 at the other end to a hydraulic ram 44 pivotally mounted on top of the housing 33 at pivot 46 and connected to a source of hydraulic pressure (not shown) which, through appropriate control valves and hydraulic hoses (not shown), extends or retracts the ram 44 to actuate the arm 38 from the closed gripping position illustrated (extended) to an open position 90° outwardly (retracted) from that illustrated.

For purposes of clarity and simplicity, the hydraulic system including power source, transmission lines, control valves, and other conventional components are omitted in the description of this and the following components. Such systems are well known in the art and can be readily supplied to perform the functions specified by those skilled in the art.

The shear means 36 comprises a pair of rails 48A and 48B on which a shear blade 50 is mounted for reciprocation between an extended position (illustrated) at one end of the rails 48A and 48B and a retracted position at the opposite end of the rails. The blade is actuated through lever arms 52A and B pivotally connected to the blade 50 at pad eyes 54A and B at one end, to the housing 33 through arms 56A and B pivotally mounted at one end to the housing at 58A and 58B and at the other end at 59A and B to the lever arms 52A and B at 60A and B, and, at the other end to hydraulic rams 62A and 62B. The rams are pivotally connected to the housing 33 through pads 63A and 63B. The lever arms 52A and 52B and the arms 56A and B are so sized and disposed that the shear blade is moved from a fully extended position as illustrated to a fully retracted position with the cutting edge 64 of the blade 50 substantially in the position of the back edge 68 thereof in the drawing by retracting the rams 62A and 62B from their illustrated extended configuration to a retracted configuration. Again, the hydraulic circuitry necessary to actuate the rams is omitted for clarity.

An "L" shaped holding arm 68 is pivotally mounted to the track 48B by a sleeve 70 and is actuated from a vertical position shown in dotted line to a horizontal position as illustrated by a hydraulic ram 72 pivotally connected to the arm 68 through a lever 74 and to the housing 33 through a pad 76.

In operation, the tree removing means 26 is configured such that the arm 38 is positioned in an open position, the blade 50 in a retracted position and the holding arm 68 in a vertical position (dotted lines). By means to be described in greater detail below, a tree to be severed 12 (phantom lines) is positioned within the confines of the rails 48A and 48B. The arm 38 is then closed and the holding arm 68 is lowered to a horizontal position by appropriate actuation of the rams 44 and 77. The rams 62A and 62B are actuated to extend the shear blade 50 through the tree 12 to sever it from its stump. The device is intended to hold and shear a tree up to 20 inches in diameter with the described mechanism.

In FIG. 1 it is seen that the tree removing means 26 is mounted to vertical rails 78A and 78B by means of rollers on a mounting plate and driven in the up and down by a hydraulic driver chain and sprocket system indicated generally at 84. The rails 78A and 78B are mounted to rails 28A and 28B through rollers to be movable between the sides of the body 14 by means of a hydraulically driven chain and sprocket arrangement 86 attached through a horizontal slot 88 in the front end 16 (FIG. 1).

With the aforedescribed structure and referring now to FIG. 1, it can be seen that the apparatus as thus far described operates as follows:

With the tree removing means 26 actuated to the far left side of the body 14 and downwardly as shown in dotted line and the arms 38 and 68 open and vertical, respectively, (dotted lines) the apparatus is maneuvered such that a standing tree is directly in line with and to the right of the tree removing means 26. This position gives the operator in cab 27 the greatest view of the components for proper alignment and actuation. With the tree so positioned, the removing means 26 is actuated to the right until it is brought into abutment with the tree, at which time the arms 38 and 68 are closed and lowered respectively and the shear blade 50 is actuated to sever the tree from the stump as was described above. The means 26 is then raised into the position illustrated with the tree 12 supported by the blade 50. The aforedescribed sequence as well as those to be described below can be programmed with suitable limit switches and electronics such that, once the sequence is initiated by the operator, each step follows automatically. With the tree 12A severed and raised as shown, it is then transported to the extreme right of the body 14 to be transferred to the conveying means 30 as will be described below.

The conveying means 30 comprises a carriage indicated generally at 90 and consisting of upper horizontal transverse arms 94A and 94B, lower horizontal transverse arms 96A and 96B and interconnecting upper and lower longitudinal structural members 98 and 100. The carriage is mounted on rollers to run on upper and lower inclined rails 102A, 102B, and 104A, 104B between the forward end 16 and the rearward end 18 of the body 14, powered by a hydraulically driven sprocket and chain arrangement 106. A ramp floor 92 is disposed beneath the rails 104A and 104B. The conveying means 30 terminates, at the rearward end thereof, in a diverter generally indicated at 108. The diverter means comprises upper and lower arcuate segments 110 and 112 supported by brace structure mounted to the rails 102A and 102B in such a manner that the carriage 90 may traverse the arcuate segments 110 and 111 to stop in abutment with the support structure 114.

In operation of the conveying means 30 and with the carriage 90 in a full forward position, the tree removing means 26 is displaced to the right until it positions a tree thereon over the ramp 92 and between the transverse arms 94A, 94B and 96A, 96B. Actuation of the conveying means 30 in an upward and rearward direction slides the tree off of the knife blade 50 and onto the ramp 92. The arms 38 and 68 are opened and raised respectively at which point rearward and upward motion of the carriage 90 is initiated through the sprocket and chain drive 106. Once the carriage 90 is past the beginning of rail 102B and 104B, the tree removing means 26 is returned to the extreme left position on the body 14 for removal of the next tree. The tree is supported at this point by the ramp 92 and slides up it under the influence of the arms 94A, 94B and 96A, 96B.

The carriage 90 proceeds up the rails 102A and B and 104A and B until the tree 12B thereon contacts the arcuate segments 110 and 112 of the diverter means at which point the tree is pushed to the left to the comminuting means described in detail hereinafter.

Figure 4:
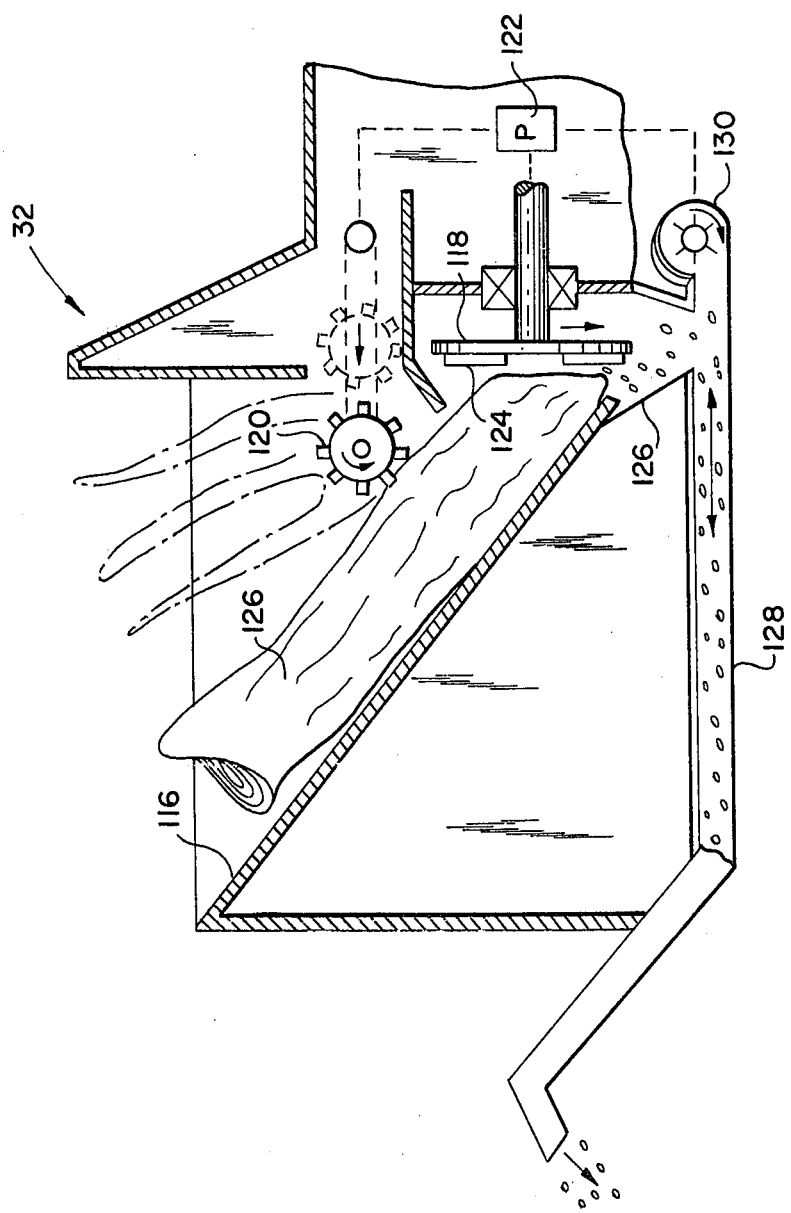
FIG. 4 is a fragmentary sectional view of the apparatus of FIG. 1 taken along the line 4—4 thereof.

The comminuting means 32 comprises a hopper 116 and, referring more specifically to FIG. 4, a rotary comminuting disc 118 and powered feed roller 120 driven by a power source 122.

The feed roller 120 is hydraulically biased by means (not shown) in the direction indicated by the arrow so that it positively engages the trunk as shown in solid lines at 130 or so that it may accept and crush tree crotches, limbs, etc., as shown in phantom line at 130A. A tree 12 deposited in the hopper 116 from the conveying means 30 is engaged by the feed roller 120 and pressed against the disc 118. As is known in the comminuting art, the disc 18 is proved with radial cutting projections 124 on its face and, when rotated at high speed, effectively comminutes the tree 12C, dropping the chips into a receiver 126 from which they are conveyed through a discharge conduit 128 under the influence of a blower 130. An 84-inch chipper disc will effectively reduce up to a 26-inch log to chips, although the capacity need not exceed 20-inch diameter trees. By this means, the device can handle tree crotches and crushed branches of up to an effective size of 26 inches.

A chip receiving trailer can be attached to the rear of the apparatus 10 to catch the comminuted chips for periodic unloading or periodic replacement as desired.

What has been set forth above is intended to be exemplary of a teaching in accordance with the invention to aid those skilled in the art in the practice thereof.

I claim:

1. An apparatus for harvesting and comminuting entire standing trees comprising:
   a vehicle comprising a body having forward and rear ends and sides and ground engaging traction means;
   tree removing means on the forward end of said vehicle comprising:
   grip means to engage and hold a tree to be harvested in a vertical position;
   shear means for severing and supporting a harvested tree;
   means to index said tree removing means from a shearing position proximate one side of said body to a transfer position proximate the other side of said body;

inclined conveying means on said other side of said body and operable between a forward position at the forward end of said body and a rearward position at the rearward end thereof to convey and elevate trees therebetween;

comminuting means at said rearward end including means to receive an entire tree and crush its branches while feeding the entire tree under positive drive thereto.

2. An apparatus in accordance with claim 1 wherein said conveying means comprises:

a carriage including a tree engaging and holding cage to receive and vertically hold a tree from said tree removing means;

means to transfer a tree from said tree removing means to said carriage;

means to move said carriage from said forward position to said rearward position;

means to eject a tree from said carriage at said rearward position; and means to reduce a tree to wood chips at the rearward end of said body including:

a hopper adjacent said rearward position of said conveying means for receiving and supporting trees ejected therefrom;

a rotary wood comminuting means including driving means beneath aid hopper for progressively reducing a tree in said hopper into wood chips as it is longitudinally fed thereto;

means to feed tree in said hopper longitudinally into said comminuting means; and means to collect and convey wood chips from said comminuting means.

3. The apparatus in accordance with claim 1 wherein said shear means comprises:

a pair of spaced parallel horizontal rails supported by said body;

a shear blade having a cutting edge supported by said rails and horizontally movable thereon between a retracted position with said cutting edge at an entry position proximate one end of said rails to a shear position with said cutting edge at the other end of said rails with said blade fully supported by said rails;

means to hold a tree to be sheared fixedly between said rails; and power means to move said blade from said retracted position to said shear position to shear and then vertically support a tree held between said rails.

4. The apparatus in accordance with claim 1 wherein said means to index said tree removing means comprises:

spaced, parallel, horizontal rails across the forward end of said body between the sides thereof;

spaced, parallel, vertical rails mounted on said horizontal rails and movable thereon between the sides of said body;

a plate supporting said tree removing means mounted on said vertical rails and movable thereon between a shearing position proximate the lower end thereof and an indexing position proximate the upper ends thereof; and means to controllably move said plate on said vertical rails and said vertical rails on said horizontal rails to index said tree removing means.

5. The apparatus in accordance with claim 4 wherein said carriage comprises a rectangular container having transverse sides normal to the body of said vehicle and one longitudinal side disposed such that the container is open on the top and the side proximate said tree removing means.

6. The apparatus in accordance with claim 5 wherein said means to transfer a tree from said tree removing means comprises means to interpose said blade into the open side of said container whereupon actuation of said container to move said carriage to said rearward position removes a tree supported thereon therefrom.

7. The apparatus in accordance with claim 6 wherein said means to eject a tree from said carriage comprises diverter means in the path of said carriage proximate said rearward position; and means to interpose said diverter means into said container as it approaches said rearward position; said diverter means disposed to wedge a tree in said container out of the open side thereof.

8. The apparatus of claim 1 wherein said comminuting means comprises walls defining a downwardly tapered hopper having an open bottom, a horizontally mounted rotating comminuting disc at said open bottom, a horizontally mounted roller in said hopper including means to drive said roller and means to bias said roller toward one of the tapered walls of said hopper.

9. A tree harvesting means comprising:

a support;

a pair of spaced, parallel horizontal rails mounted on said support;

a shear blade having a cutting edge supported by said rails and horizontally movable thereon between a retracted position with said cutting edge at an entry position proximate one end of said rails and a shear position with said cutting edge at the other end of said rails with said blade fully supported by said rails;

means to hold a tree to be harvested fixedly between said rails; and power means to move said blade from said retracted position to said shear position to shear and then vertically support a tree held between said rails.

10. The apparatus in accordance with claim 9 further comprising means to index said support to convey a harvested tree to a point of further processing.

11. The apparatus in accordance with claim 10 wherein said means to index said support includes means to move said support vertically to and from a shear position and means to traverse said support horizontally.

* * * * *